United States Patent [19]

Sumi et al.

[11] Patent Number: 4,536,057

[45] Date of Patent: Aug. 20, 1985

[54] FILTER MOUNTING MECHANISM FOR AN OPTICAL ASSEMBLY

[75] Inventors: Akiyasu Sumi; Tohru Kawai, both of Kanagawa, Japan

[73] Assignee: Canon Kabushiki Kaisha, Tokyo, Japan

[21] Appl. No.: 591,386

[22] Filed: Mar. 20, 1984

Related U.S. Application Data

[62] Division of Ser. No. 363,608, Mar. 30, 1982, abandoned.

[30] Foreign Application Priority Data

Apr. 14, 1981 [JP] Japan ................................ 56-55762
Apr. 14, 1981 [JP] Japan ................................ 56-53357
Sep. 24, 1981 [JP] Japan ................................ 56-151270
Jan. 27, 1982 [JP] Japan ................................ 57-12423

[51] Int. Cl.³ .......................... G02B 7/00; G02B 5/20
[52] U.S. Cl. ................................... 350/318; 350/257
[58] Field of Search ...................... 350/318, 257, 580

[56] References Cited

U.S. PATENT DOCUMENTS 2,898,832  8/1959  Schmuck ............................ 350/318

Primary Examiner—Jon W. Henry
Attorney, Agent, or Firm—Toren, McGeady, Stanger, Goldberg & Kiel

[57] ABSTRACT

A filter mounting mechanism capable of attachment to and detachment from an optical assembly such as the interchangeable lens assembly of a single lens reflex camera is provided with a holding member arranged to rotatably carry a filter in such a manner that the filter may be rotated from externally of the optical assembly in order to enable adjustment of the filter. The mechanism includes a device for preventing the filter from becoming loosened while in use and the arrangement further operates to facilitate use of a thin film filter such as a gelatin filter in cases where such a filter is to be used by preparation and cutting thereof into a desired size and shape.

3 Claims, 28 Drawing Figures

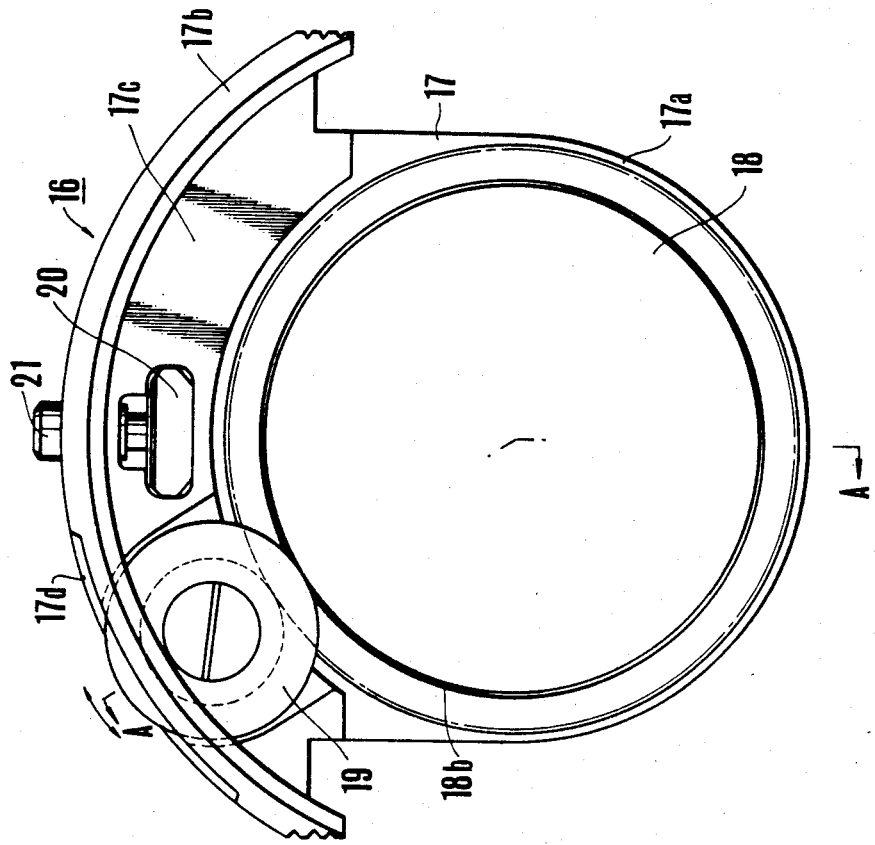
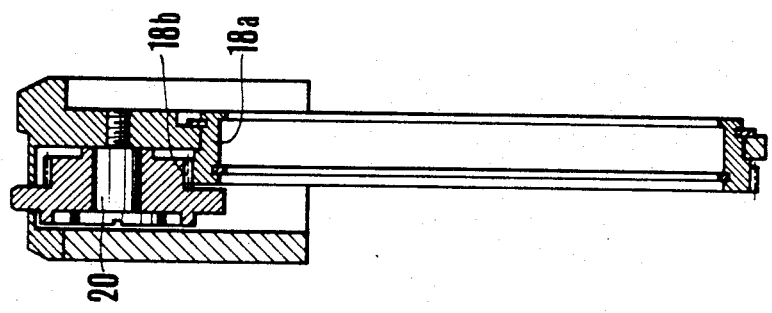

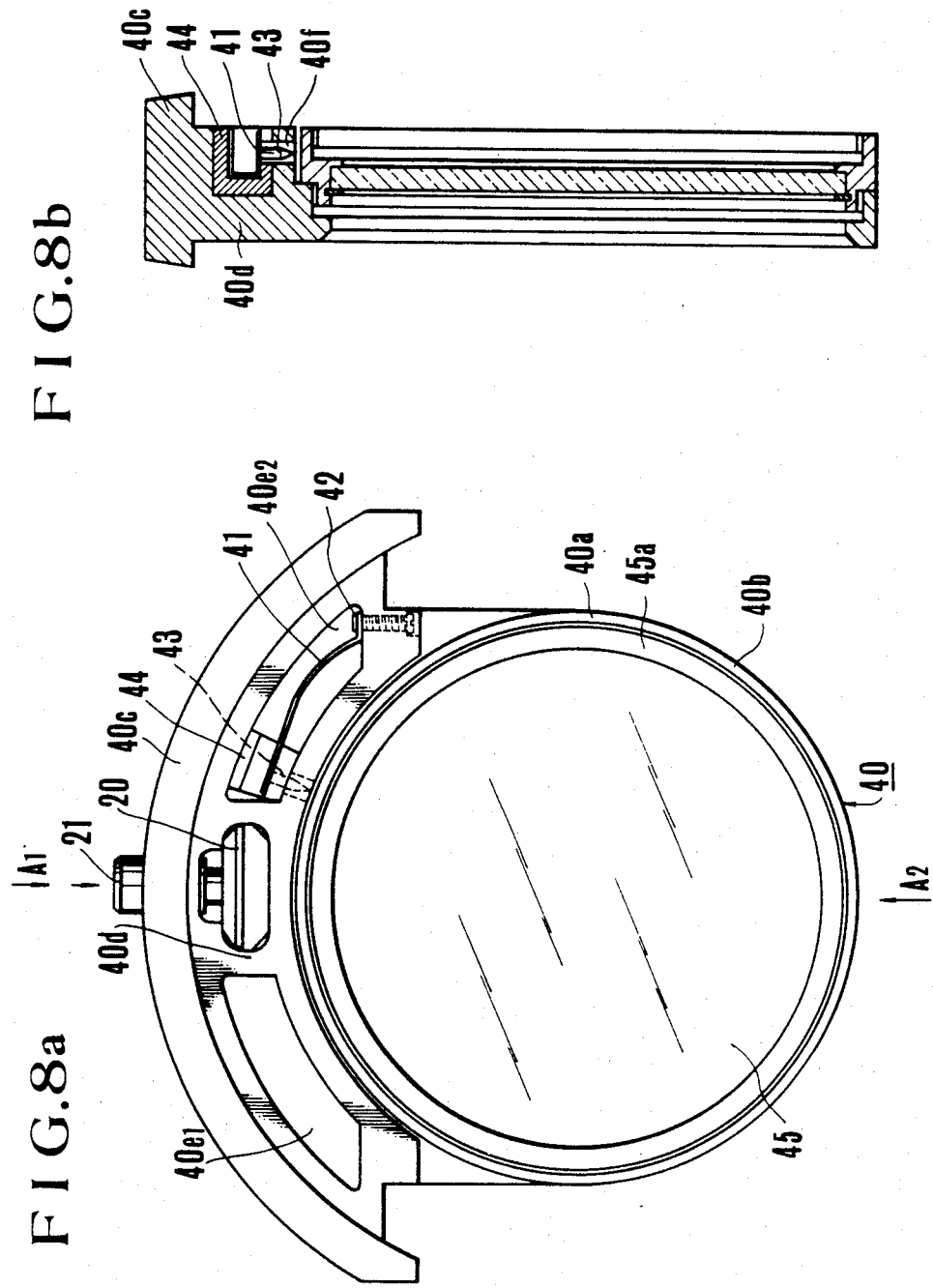

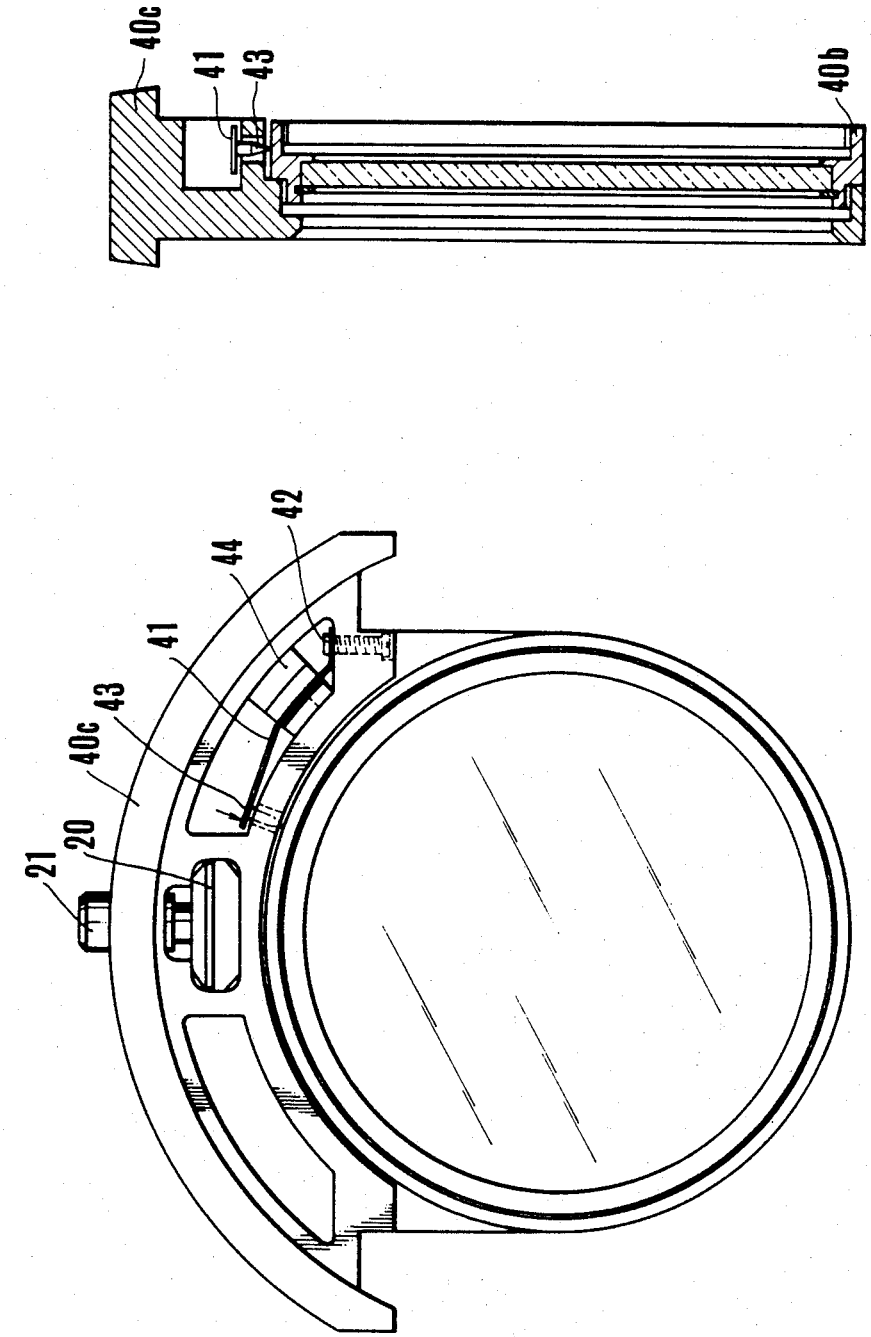

FILTER MOUNTING MECHANISM FOR AN OPTICAL ASSEMBLY

This is a division of application Ser. No. 363,608, filed Mar. 30, 1982, now abandoned.

The present invention relates generally to accessories for optical apparatus and more particularly to a mechanism for enabling a filter to be mounted for use in optical apparatus such as a photographic lens assembly for a single lens reflex camera, a video camera, or the like. The invention more particularly relates to a filter mechanism which is attachable to and detachable from the optical assembly with which it is used.

In the prior art, conventional filter devices may be divided generally into two types. One type includes devices known as filter units and the other type involves devices called filter holder units. In the former type, a filter of one specific kind is fixedly attached to a filter holder. In the latter type, a commercially available screw threaded filter is threadedly attached into a filter holder in a desired manner before use thereof.

In the case of the former type of filter device, varied kinds of filters such as color filters, color conversion filters, ND filters, polarizing filters, special filters, and the like must be provided with their own holders. Where these different types of filters are to be used, the former type of filter device is not only inferior in terms of its portability, but it also may become unduly expensive. Such disadvantages of the former type of filter are eliminated by utilization of the latter type which permits interchange among different kinds of commercially available filters because each of these filters may be threadedly engaged into the same holder member.

However, these inserting type of filters which are included in the latter type, i.e., the filter holder unit, are designed so as to be used by inserting the filter into a partially cutaway part of an interchangeable lens barrel. Therefore, even when the latter type is used, shortcomings will still exist in that the filter will not permit operation thereof from externally of the optical assembly such as rotating of the filter from the outside of the assembly.

Optical apparatus such as single lens reflex cameras have various accessories including glass filters of various types, auxiliary lenses, and the like which may be utilized therewith. In utilizing such an accessory, the accessory is screwed into an accessory holder such as a filter holding frame and the accessory holder is then fitted into an inserting part provided on the lens barrel of the lens assembly.

Accessories must be arranged so as to be interchangeable with each other in relationship to the accessory holder. In most cases, therefore, these accessories are arranged in a screw threaded type of device which is simple in construction and which provides easy mounting and dismounting. However, in cases where the accessory and the accessory holder are arranged with external threads and internal threads adapted to be engaged relative to each other, vibrations occurring in the optical assembly or similar forces which may occur during photography with the accessory holder mounted on the lens barrel after the accessory has been threaded in place and fixed to the accessory holder will tend to loosen the accessory. Thus, problems may arise during use.

Accordingly, the present invention is directed toward provision of a filter mechanism which may be arranged to have a filter rotatably mounted thereon and which will permit the filter to be rotated from externally of the mechanism.

The invention is further intended to enable filter devices of the aforementioned type to be arranged in accordance with the different purposes desired in utilization of the device.

The invention also seeks to overcome inconveniences which may occur when a filter becomes loosened during use of the filter by preventing such loosening from occurring when the filter is in the operative position.

The invention is more particularly intended to enable utilization of a thin filmy filter, such as a gelatin filter, in optical apparatus of the type described by preparing the filter into a desired shape and size.

SUMMARY OF THE INVENTION

Briefly, the present invention may be described as an optical assembly having means for mounting a filter thereon comprising a filter holding member arranged to be attachable in and detachable from the optical assembly, said filter holding member including a filter holding part having a filter rotatably mounted therein to permit the filter to be rotated about the optical axis of the optical assembly and filter operating means linked with the filter and arranged to permit the filter to be operated from externally of the optical assembly by rotation of the filter about the optical axis of the assembly.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 4(a) is a sectional view of a third embodiment of the invention;

FIG. 4(b) is a front view of the embodiment depicted in FIG. 4(a);

FIG. 8(a) is a plan view of a further embodiment of the invention;

FIG. 8(b) is a sectional view of the embodiment of FIG. 8(a);

FIG. 8(c) is a plan view showing a different operating condition of the embodiment of FIG. 8(a);

FIG. 8(d) is a sectional view of this embodiment in the operating condition depicted in FIG. 8(c);

DETAILED DESCRIPTION OF THE PREFERRED EMBODIMENTS

Figure 1:
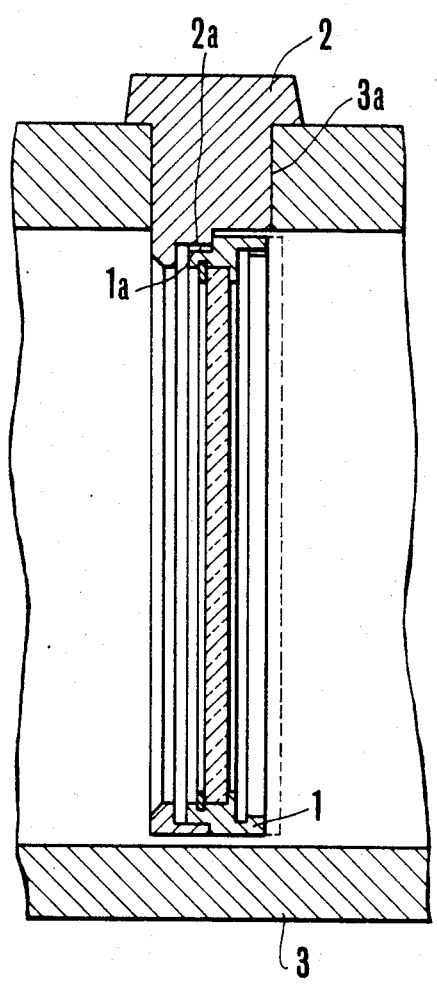
FIG. 1 is a sectional view showing an example of a conventional type of filter device which is capable of attachment to and detachment from an optical apparatus.

In order to better understand the invention, a conventional filter mechanism of the attachable and detachable type is shown in FIG. 1. The mechanism depicted in FIG. 1 includes a filter 1 which is screw threaded into and fixed on an accessory holder 2 by means of screw threaded parts 1a and 2a. The accessory holder 2 is then mounted on a lens barrel 3 after which, when the filter 1 becomes loosened, it will move out of its position to a position indicated in dotted line in FIG. 1. With the filter in such a position deviating from the desired position, the accessory holder cannot be removed from the lens barrel 3 and when the filter 1 must be replaced with another filter, problems may arise.

In accordance with the present invention, a filter mechanism is provided with means for enabling rotation of the filter from externally of the optical assembly in order to enable the filter to be adjusted and arranged in a desired manner.

Figure 2B:
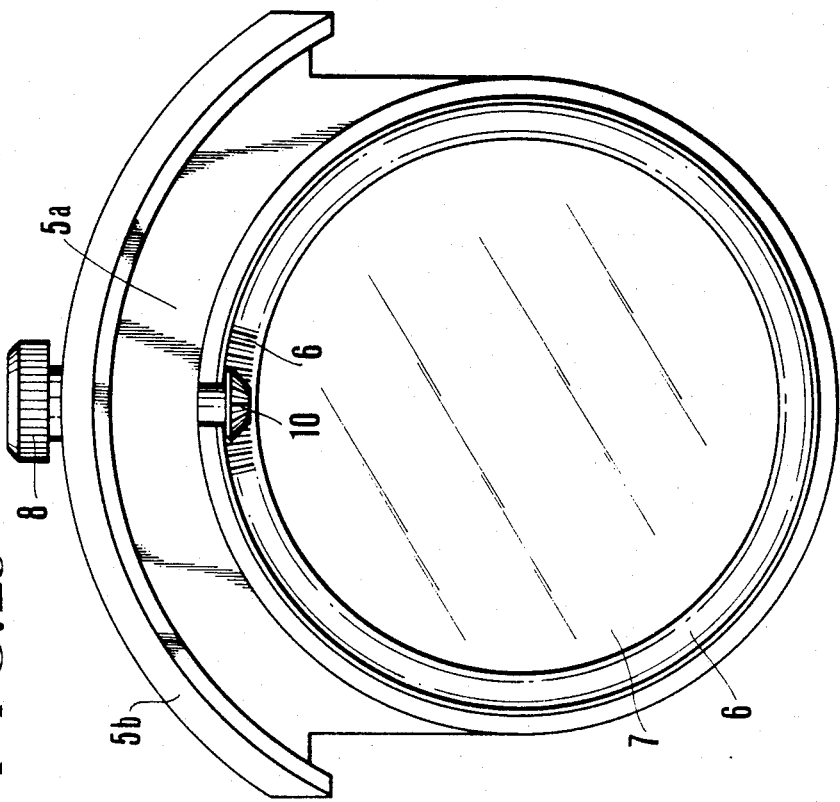
FIG. 2(b) is a front view of the mechanism shown in FIG. 2(a)
Figure 2A:
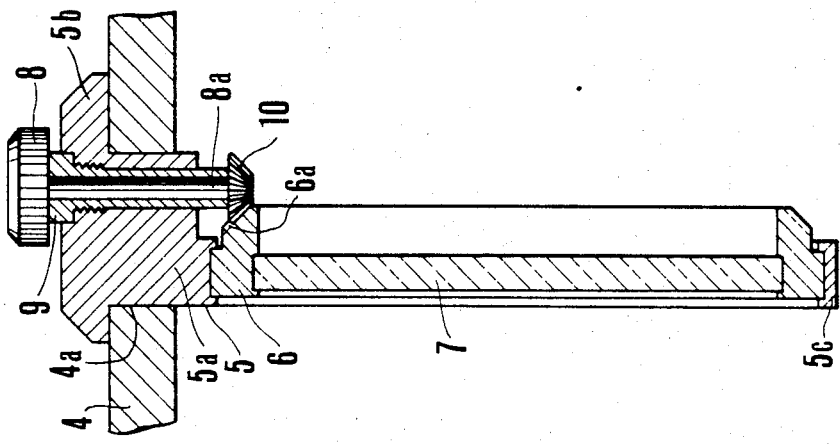
FIG. 2(a) is a sectional view of a mechanism in accordance with the present invention.

Referring first to FIGS. 2(a) and 2(b), there is depicted a first embodiment of the invention which permits rotating operation of the filter after mounting of the filter device on the optical apparatus.

The embodiments of FIGS. 3(a), 3(b), 4(a), and 4(b), to be described hereinafter, also operate to permit turning operation of the filter after mounting of the filter device on the optical apparatus.

In the embodiment of FIGS. 2(a) and 2(b), a lens barrel including a fixed tube 4 is provided with an inserting part 4a formed therein. A holder 5 of the filter mechanism of the invention is formed to include an arcuate base part 5a which may be inserted into the insertion part 4a. The filter mechanism also includes a cover part 5b arranged on the upper portion of the base part 5a and extending continuously therefrom in order to serve as a grip or handle to be used in mounting and dismounting the filter mechanism on and from the fixed tube 4. The filter mechanism also includes a frame part 5c which is arranged to extend continuously from the base part 5a and which includes a filter frame 6 secured thereto. A filter 7 is secured to the filter frame 6.

The filter mechanism is provided with a knob 8 for enabling operation of the filter frame 6. A shaft 8a of the knob 8 extends through a sleeve 9 to the inside of the fixed tube 4. A bevel gear 10 is secured to one end of the shaft 8a, the bevel gear 10 enaging a gear 6a provided on the filter frame 6. The filter holder 5 may either be fixed to the fixed tube 4 or arranged so as to be attachable to and detachable from the inserting part 4a.

In the device depicted in FIGS. 2(a) and 2(b), the polarizing direction of a polarizing filter or the like may be altered by rotating the operating knob 8. When the operating knob 8 is turned, the gear arrangement including the gears 10 and 6a will cause the filter frame 6 to rotate and thus the filter 7 may be appropriately rotated.

Figure 3B:
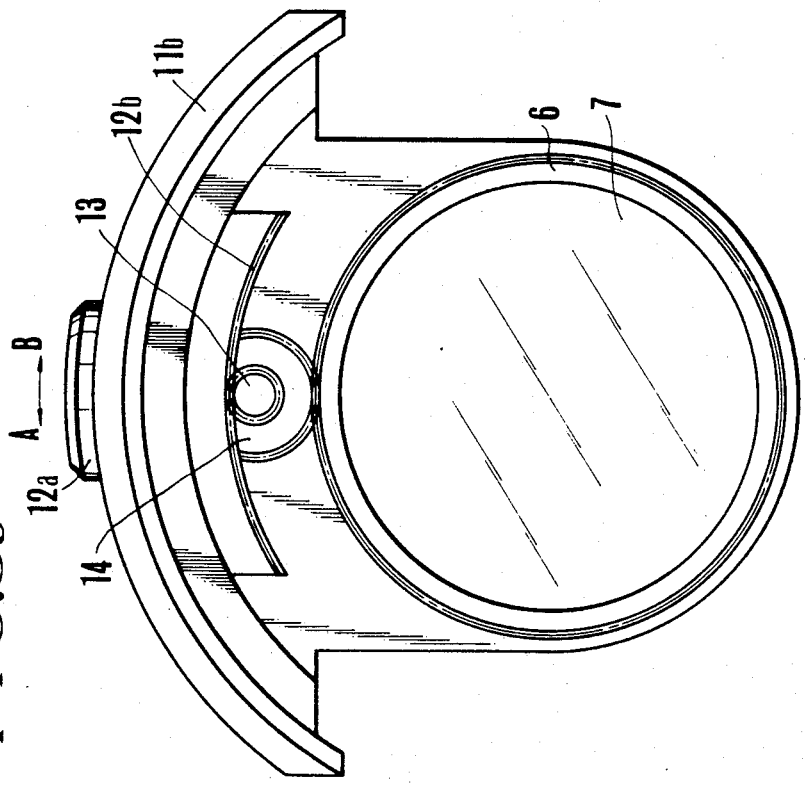
FIG. 3(b) is a front view of the second embodiment shown in FIG. 3(a)
Figure 3A:
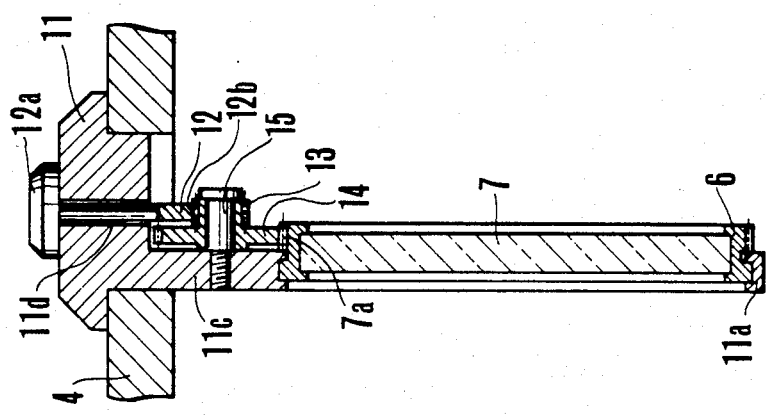
FIG. 3(a) is a sectional view showing a second embodiment of the invention.

FIGS. 3(a) and 3(b) show another embodiment of the invention which differs somewhat from the emboodiment depicted in FIGS. 2(a) and 2(b) with respect to the device for operating the filter. In the case of the embodiment of FIGS. 3(a) and 3(b), the extent of displacement of the filter on the optical axis (the amount of rotation) may be adjusted by means of a sliding operation of an operation member. In FIGS. 3(a) and 3(b), members performing the same functions are identified by reference characters similar to those utilized in FIGS. 2(a)–(b).

In the arrangement depicted in FIGS. 3(a)–(b), a filter holding member 11 includes a frame 11a which rotatably carries a filter 7. A grip 11b is provided for attaching and detaching the filter holding member 11 to and from a lens barrel 4. The holding member 11 includes a base part 11c and the frame or filter holding part 11a is arranged to have the filter 7 rotatably fitted thereon.

The filter holding member 11 is provided with a slot 11d which is arranged to have an operation member 12 extend therethrough. A grip part 12a of the operation member 12 is arranged to protrude to the exterior of the device in order to enable operation by sliding movement of the grip 12a in the direction of the arrows A, B, as indicated in FIG. 3(b).

The operation member 12 is also provided with a toothed part 12b formed along one end thereof. The filter 7 and the operation member 12 are connected through a system of connecting gears 13 and 14. The toothed part 12b of the sliding operation member is arranged to engage the smaller gear 13. The larger gear 14 is arranged to engage a toothed part 7a formed along the outer circumference of the filter 7. A retaining screw 15 is provided for retaining the gears 13 and 14 in place.

In the filter device arranged in accordance with FIGS. 3(a)–(b), when the operation member is slidably moved in the direction of the arrows A-B, the smaller gear 13 which engages the toothed part 12b will rotate, thereby driving the larger gear 14 into rotation in order to cause the filter 6 to rotate accordingly so that the polarizing filter 7 may be rotated to enable adjustment thereof.

The embodiment of the invention depicted in FIGS. 4(a) and 4(b) comprises an example of a simpler structural arrangement of the filter mechanism in accordance with the invention. In this embodiment, the filter device 16 comprises a filter holding member 17 and a gear 19 for operating a filter 18. The filter holding member 17 consists of a holding part 17a which rotatably carries the filter 18, an operation part 17b for attachment and detachment of the device to and from an inserting part of an optical assembly (not shown) and an engaging part 17c which is arranged to engage the aforementioned inserting part when the device is inserted therein.

The filter operating gear 19 is mounted by means of a screw 20. A portion of the peripheral part of the gear protrudes to the outside of the assembly from the operation part 17b of the filter holding member. The toothed part of the gear 19 is arranged to engage a toothed part 18b formed along the outer circumference of the frame 18a of the filter 18.

This embodiment further includes a filter lock member 20 which is arranged to be movable toward the exterior of the side face of the engaging part 17c of the filter holding member 17 and to be retractable therefrom. When the filter device 16 is attached in the inserting part of the optical assembly, the lock member 20 engages the assembly in order to prevent the filter device from becoming detached. An unlocking member 21 is arranged such that when the member 21 is pushed, it will retract the filter lock member 20 toward the inside of the engaging part 17c in order to enable the filter mechanism to be detached.

In the filter mechanism arranged in the manner described above, the portion of the operating part 17b which is arranged to have the operating gear 19 protrude therefrom is formed into a recess 17d to enable an operator to rotate the filter 18 by turning the operating gear 19. With the operating gear 19 and the filter 18 arranged to provide a suitable gear ratio, i.e., 1:2 or 1:4, the extent to which the filter 18 is moved may be discerned by determining the number of revolutions of the operating gear 19.

Further embodiments of the invention to be described hereinafter, including the embodiments of FIGS. 5(a)–(d), 6(a)–(c), 7(a)–(d), 8(a)–9, and 10(a)–(b) are provided with means for preventing the filter from becoming loose after the filter device has been mounted on an optical assembly. In the embodiments of FIGS. 5(a)–(d), 6(a)–(c), and 7(a)–(d), when an accessory holder is mounted on a lens barrel after an accessory such as a filter or an auxiliary lens has been attached to the holder, the accessory may be locked to the holder. Thereafter, the accessory will not become loosened due to vibrations or other forces and the holder may be smoothly detached from the lens barrel. Furthermore, when the holder is detached from the lens barrel or similar part of an optical assembly, the accessory and the accessory holder will be automatically released from their locked engagement in order to facilitate interchange of accessories.

Referring first to FIGS. 5(a)–(d), an accessory holder 25 consists of an annular part 25b which is provided with a threaded part 25a for threaded attachment of an accessory 29, such as a filter or the like. A grip 25c is also provided and a connecting part 25d connects together the annular part 25b and the handle or grip 25c.

The mechanism of this embodiment also includes pin lock members 26, 27, and 28 which are inserted in a hole formed in the connecting part 25d of the accessory holder 25. This hole consists of a part which is arranged to have the pin lock members 26 and 27 inserted therein and another portion which is arranged in a direction almost perpendicular to the first portion and which communicates with the annular part 25b. The pin lock member 26 is inserted into the hole from one side of the connecting part 25d with its head portion remaining exposed to the exterior and being arranged so as to avoid outward removal thereof. The pin lock member 26 is linked to the pin member 27.

Figure 5A:
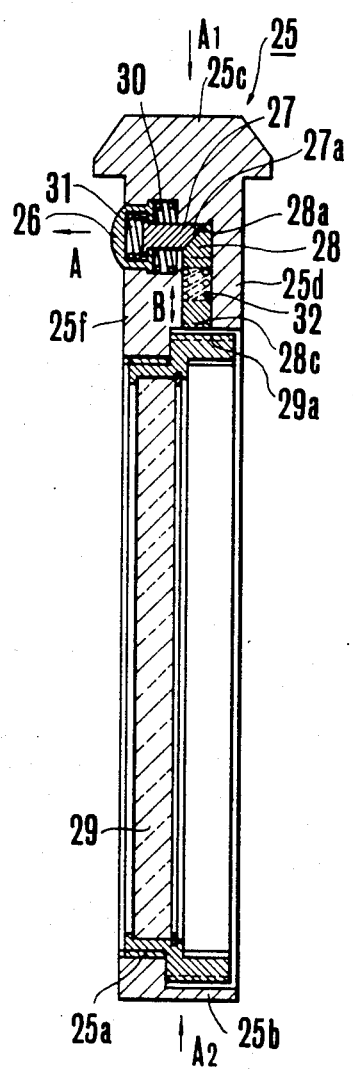
FIG. 5(a) is a sectional view of a further embodiment of the invention.
Figure 5B:
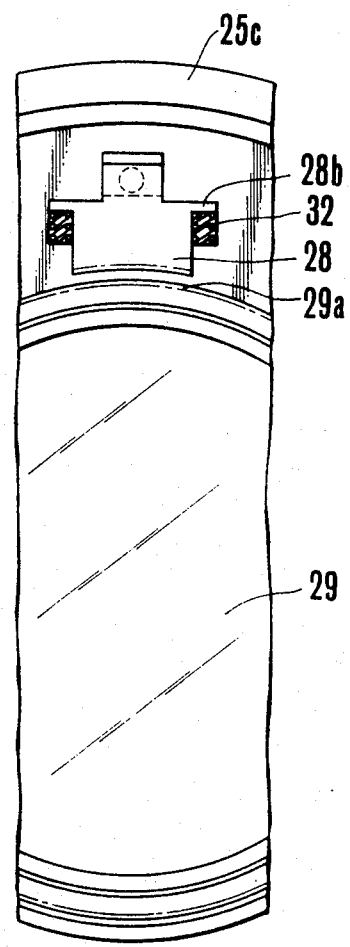
FIG. 5(b) is a sectional view partially broken away taken along the line $A_1-A_2$ of FIG. 5(a)
Figure 5C:
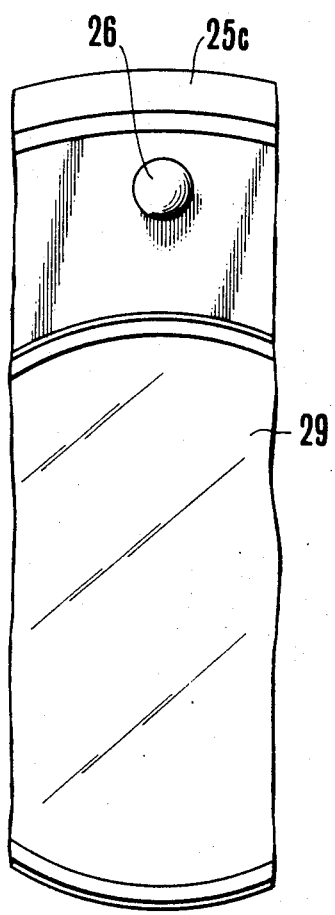
FIG. 5(c) is a side view partially broken away of the embodiment of FIG. 5(a)
Figure 5D:
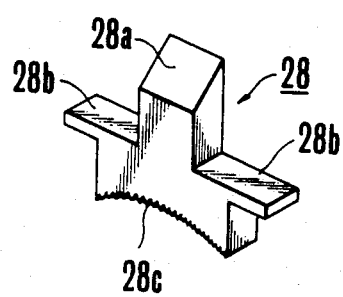
FIGS. 5(d) and 5(e) are perspective views of lock members used in the embodiment of FIGS. 5(a)-5(c)
Figure 5E:
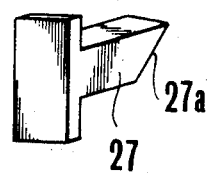
Figure 6C:
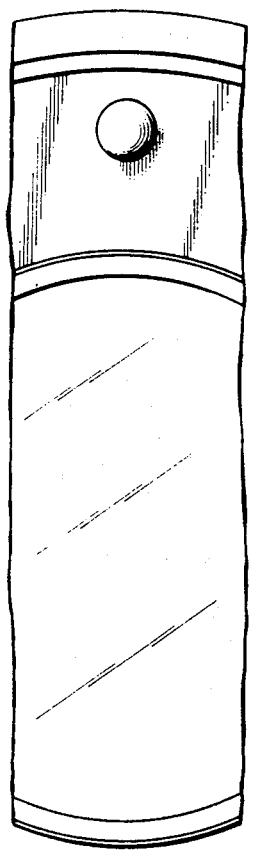
FIG. 6(c) is a side view partially broken away of the device of FIG. 6(a)
Figure 6A:
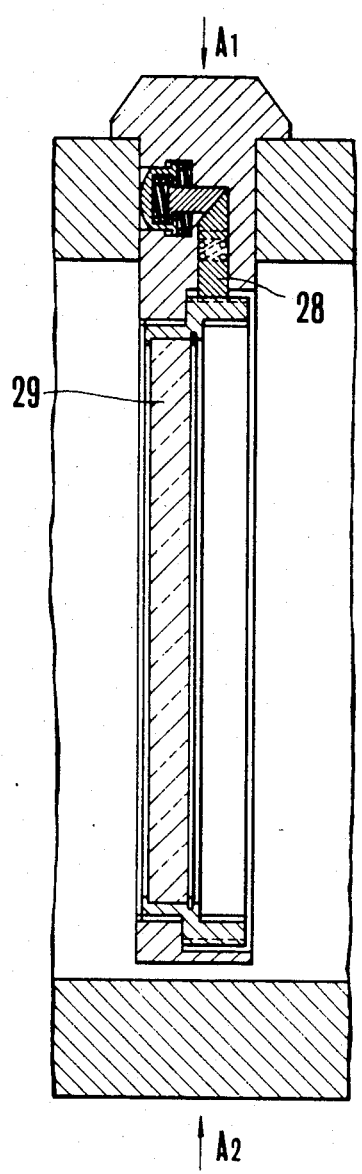
FIG. 6(a) is a sectional view of a further modification of the present invention.
Figure 6B:
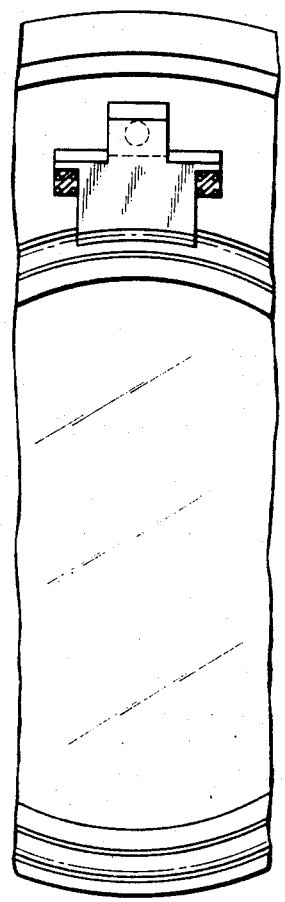
FIG. 6(b) is a sectional view taken along the line $A_1-A_2$ of FIG. 6(a)

Referring to FIG. 5(e), the pin member 27 is shown in greater detail to include a slanting face 27a. In FIG. 5(d), the pin member 28 is shown to include a slanted face 28a. The pins 27 and 28 abut each other along their slanted faces 27a and 28a. Another face of the pin lock member 28 is disposed in a position to open toward the annular part 25b in order to face toward an outer circumference of the accessory 29 and to pass through a hole in the connecting part 25d, as shown in FIG. 5(d).

Between the pin lock member 27 and the wall face of the hole in the connecting part 25d, there is provided a coil spring 30. Another coil spring 31 is disposed between the pin lock members 26 and 27. The springs 30 and 31 operate respectively to urge the lock pins 26 and 27 in the direction of the arrow A shown in FIG. 5(a).

The lock pin 28 is urged by a coil spring 32 which is disposed between arm portions 28b of the pin 28 and the wall face of the aforementioned hole in the part 25d. One side of the pin lock member 28 facing the filter 29 is formed with an arcuate face having a knurled surface 28c.

In a condition where the accessory holder 25 is pulled out of the lens barrel, the pin lock members 26, 27, and 28 are urged in the directions of the arrows A and B, as shown in FIGS. 5(a)–(c) by the coil springs 30, 31, and 32, respectively. During this condition, the knurled surface 28c of the pin lock member 28 is located a distance away from the outer circumferential face of the filter and the end face of the pin lock member 26 protrudes from the side face of the connecting part of the holder.

The accessory member may be replaced with another member with ease with the mechanism in this condition. After the accessory has been attached to the holder, with the holder inserted into the inserting part of the lens barrel, the protrudent face of the pin lock member 26 is pushed in a direction opposite to the direction of arrow A. With the pin lock member 26 pushed in this direction, the locking pin 28 is pushed through the linking lock pin 27 in the direction of arrow C against the force of the spring 32. This will cause the knurled surface 28c of the locking pin 28 to protrude toward the circular annular part of the accessory holder and thereby cause the knurled surface to abut against the threaded part 29a of the filter in such a manner that it becomes engaged therewith. The filter 29 is engaged with the holder through the engagement between the locking pin 28 and the filter so that it may be prevented from becoming loose during vibrations, shock, or the like.

Figure 7C:
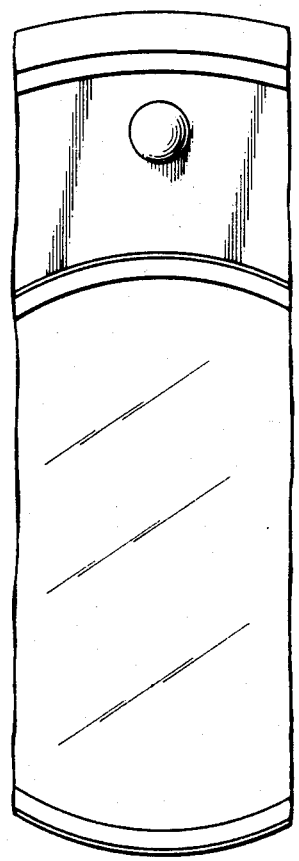
FIG. 7(c) is a side view partially broken away of the embodiment of FIG. 7(a)
Figure 7A:
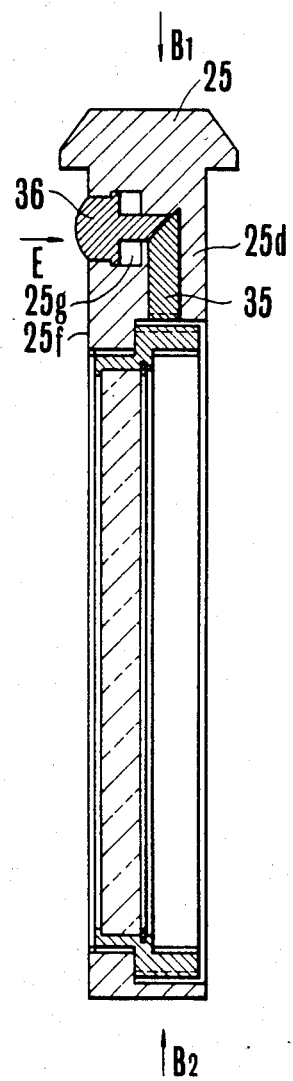
FIG. 7(a) is a sectional view of a further embodiment of the invention.
Figure 7B:
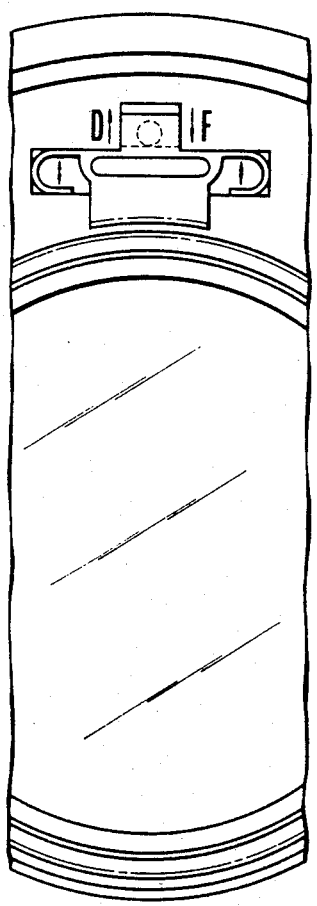
FIG. 7(b) is a sectional view taken along the line $B_1-B_2$ of FIG. 7(a)
Figure 7D:
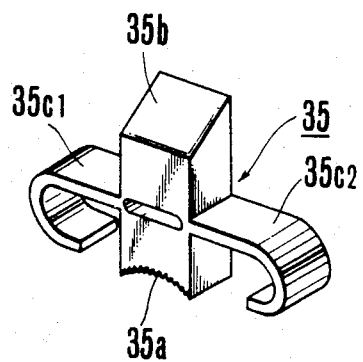
FIG. 7(d) is a perspective view showing a lock member used in the embodiment of FIG. 7(a)

Another embodiment of the invention is depicted in FIGS. 7(a)–(d) wherein the linking lock pin 27 and the spring members 30, 31, and 32 are not utilized. Shown in FIG. 7(d) is a lock pin 35 wherein one end face of the lock pin 35 is formed with a knurled surface 35a which is arranged to confront the filter. The other end of the lock pin 35 is formed with a slanted face 35b and is arranged to abut against a push pin 36. The lock pin 35 is preferably prepared by molding from elastic resin material. As shown in FIG. 7(d), the lock pin 35 is provided with two arms $35c_1$ and $35c_2$ which are curved at their outer ends. The pin 36 has one end thereof arranged to abut against the slanted face of the lock pin 35 and it is movably disposed within a hole 25g which is provided in the connecting part 25d of the accessory holder 25. The other end of the pin 36 protrudes from a side face 25f of the connecting part 25d.

When the lock pin 35 is inserted into the hole in the connecting part 25d, the pin 35 is pushed up in the direction of the arrow D (see FIG. 7(b)) by reaction forces developed at the curved arms 35c₁ and 35c₂ of the lock pin 35 in the direction of the arrows as indicated in FIG. 7(b). This upward pushing force brings the knurled face of the lock pin 35 to a position away from the outer circumference of the filter.

After the filter is mounted on the accessory holder 25, when the holder is inserted into the inserting part of the lens barrel, the protrudent face of the pin 36 is pushed in the direction of an arrow E seen in FIG. 7(a). This pushing force E pushes down on the lock pin 35 in a direction indicated by arrow F against the upwardly directed force D generated by the curved arms. As a result, the knurled face 35a of the lock pin 35 is brought into engagement with the threaded part 29a on the outer circumference of the filter 29 so that the filter will thereby be held firmly to prevent loosening thereof.

In the embodiments described above, the lock pins 28 and 35 are arranged to be pushed downwardly by the action of push pins 26 and 36 when the accessory holder is inserted into the lens barrel and the accessory mounted in the holder, for example a filter or the like, may then be engaged by an appropriate part of the lock pin in order to prevent loosening of the filter. When the accessory holder is removed from the lens barrel, the filter may be readily unlocked and released in order to facilitate interchangeability of the filters.

Other embodiments of the present invention which provide means for preventing loosening of a filter mounted in an optical assembly are shown and described hereinafter in FIGS. 8(a)–9 and 10(a)–(b).

In FIGS. 8 (a)–(d) and 9, there is shown a first example of a device involving loosening preventive means wherein an accessory holder 40 comprising an annular filter holding member 40b is provided. The holder 40 includes a threaded part 40a, a grip part 40c which may be used for mounting the filter mechanism onto a lens barrel, and an arm portion 40d which operates to connect the filter holding part 40b and the grip part 40c with each other.

Filter lock means 20 and 21 are provided and the lock means shown in the embodiment of FIGS. 8(a)–(d) are the same as those utilized in the embodiment described in connection with FIGS. 4(a)–(b).

Figure 9:
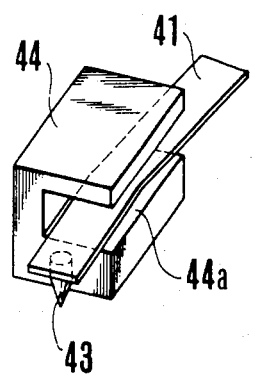
FIG. 9 is a sectional view showing an operating part of the embodiment of FIGS. 8(a)–8(d) which operates to prevent loosening.

The arm part 40d is provided with cutouts 40e₁ and 40e₂ in order to reduce the weight of the accessory holder 40. The cutout 40e₂ has mounted therein a spring member 41 which is disposed with one end of the spring member 41 affixed to the holder 40 by a screw 42. The spring member 41 is bent into a curved configuration and at the free end thereof there is mounted an engaging pin 43. The engaging pin 43 is inserted into a hole 40f provided between the cutout 40e₂ and the annular part 40b of the holder. An operation member 44 is provided which is arranged to be movable within the cutout 40e₂ as indicated by the arrow in FIG. 8(c). The operation member 44 is formed with a sectional configuration having a generally U- or C-shape, as best seen in FIG. 9.

In the operation of this embodiment, when the filter is mounted on the accessory holder 40, the operation member 44 is moved to the left from the position shown in FIG. 8(c) to the position shown in FIG. 8(a). As a result of this leftward or counterclockwise movement of the operation member 44, the left or free end of the spring member 41 will be raised as a result of engagement of the free end of the spring member with the face 44a of the operation member 44. As a result, the spring member 41 will essentially be resiliently rotated in a clockwise direction about its fixed end supported by the screw 42 and this movement will cause the engaging pin 43 to be raised and to move away from the threaded part 45a formed along the outer circumference of the frame of the filter 45. With the device in this condition, the filter 45 may be screwed into the threaded part 40a provided along the inner circumference of the annular portion of the accessory holder 40.

Following this phase of operation, the operation member 44 is moved to the right or clockwise from the position depicted in FIG. 8(a) to the position depicted in FIG. 8(c). As a result, the spring member 41 is caused to be bent so that its free end containing the engaging pin 43 is moved downwardly. As a result, the free end of the spring member 41 will be urged in the direction of the arrow shown in FIG. 8(c) and the engaging pin will be urged against the threaded part 45a of the outer circumference of the filter frame with the pin 43 extending through the hole 40f (see FIG. 8(d)). Accordingly, after the accessory holder 40 is inserted into the inserting part of the lens barrel and after the conditions of the operation member 44 and engaging pin 43 have been brought into the position depicted in FIG. 8(c), the filter will be firmly held in place and will not loosen regardless of vibrations, shock, or the like.

Figure 10A:
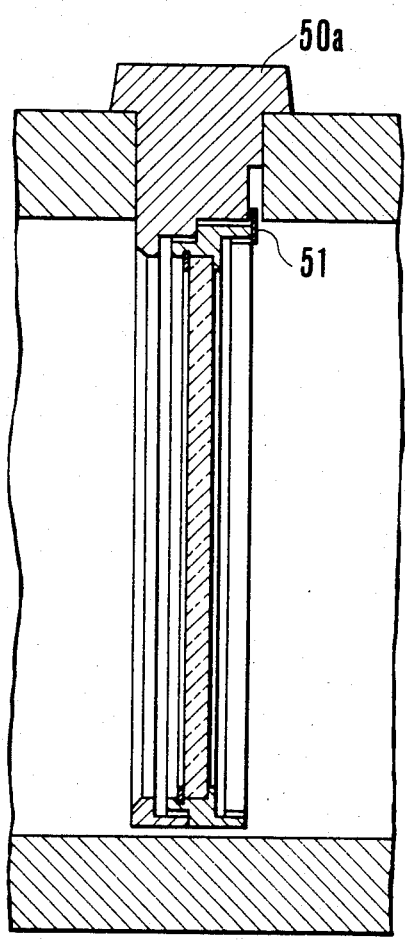
FIG. 10(a) is a sectional view of an additional embodiment of the invention.
Figure 10B:
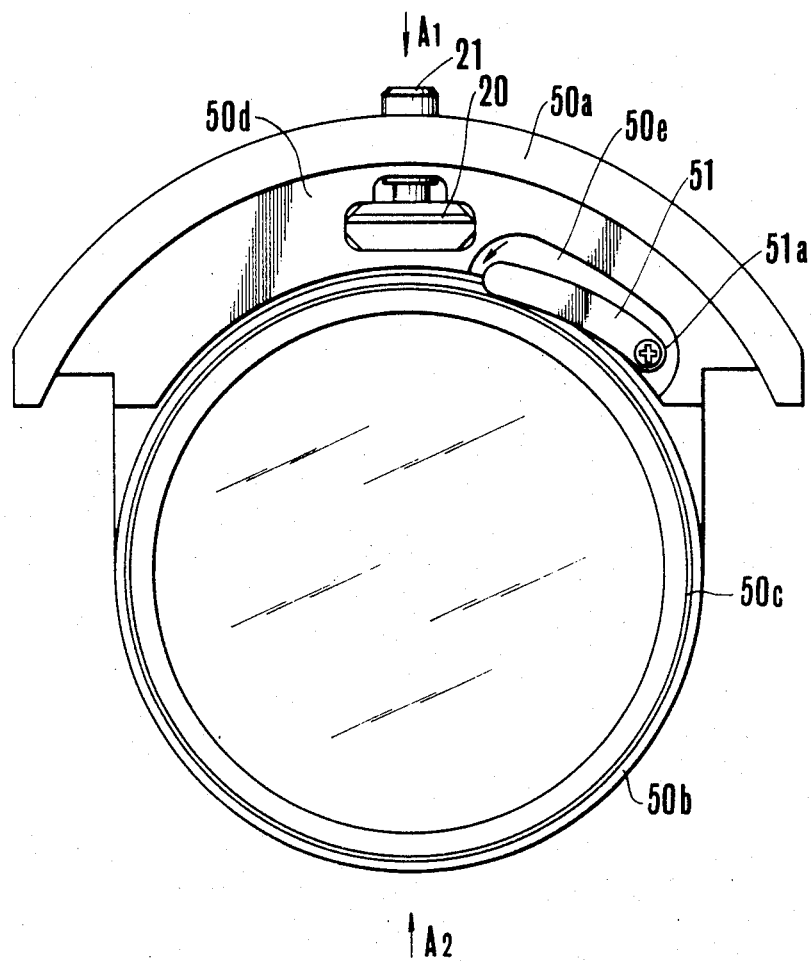
FIG. 10(b) is a plan view of the embodiment of FIG. 10(a)

A further embodiment of the invention is depicted in FIGS. 10(a) and 10(b). In this embodiment, the accessory holder comprises a grip portion 50a, a circular annular part 50b having a threaded part 50c arranged to allow a filter or similar accessory to be threadedly engaged therein, and a connecting part 50d. The same lock means 20, 21 utilized with the previously disclosed embodiment may be also provided with the embodiment of FIGS. 10(a)–(b). The connecting part 50d is provided with a recessed part 50e. At the recessed part 50e there is provided a lock member 51 which is mounted by means of a screw and which is arranged to be rotatable about one end 51a thereof.

After the filter is threadedly engaged into the circular annular part 50b of the accessory holder, the lock member 51 is rotated downwardly or counterclockwise as indicated by the arrow in FIG. 10(b) in order thereby to engage, tighten, and lock the filter by mounting the holder 50 upon the lens barrel. When the holder is mounted in this manner, the filter may again be prevented from becoming loosened, as described previously.

Figure 11:
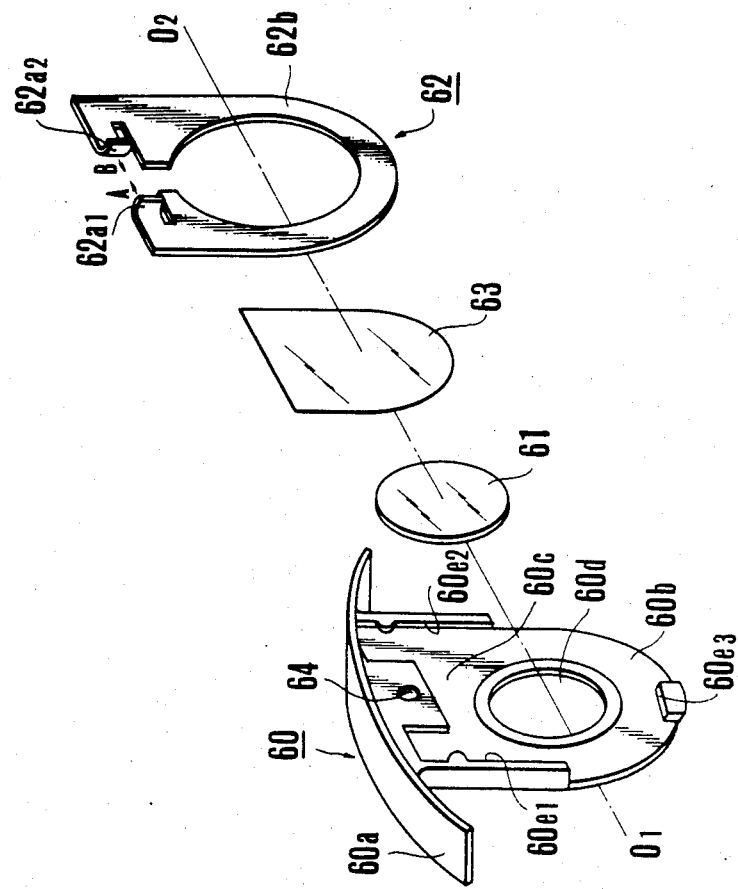
FIG. 11 is an exploded perspective view of a further embodiment of the invention.
Figure 12:
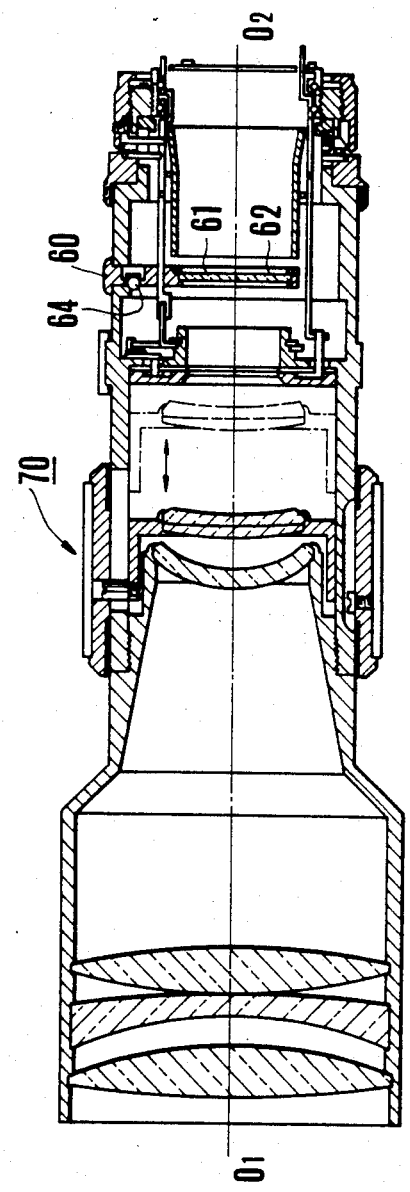
FIG. 12 is a sectional view showing the embodiment of FIG. 11 arranged for use in an interchangeable lens assembly.

A further embodiment of the present invention is depicted in FIGS. 11 and 12. In this embodiment, a filter device is depicted which is attachable to and detachable from an interchangeable lens assembly and the filter device is arranged to facilitate mounting and dismounting of a thin film filter such as a gelatin filter onto and from the filter device.

When utilizing a gelatin filter, the photographer will often cut it into a desired shape. Further, since such a filter is in the shape of a thin film, the film cannot be easily maintained with a flat planar configuration on the optical axis of the equipment. The present embodiment is directed to providing a solution for this problem and is arranged to be suitable for mounting of a thin film filter and particularly a filter made of soft material.

Referring to FIG. 11, there is shown a filter holding member 60 which comprises a grip part 60a for enabling the holding member 60 to be attached and detached from an optical assembly. A filter holding part 60b is provided on a thin film filter mounting member 60c. An optical filter 61 may be fixedly attached to an aperture 60d of the filter holding part 60b and the filter mounting member 60c is provided with lock parts $60e_1$, $60e_2$, and $60e_3$ which are arranged to lock the thin film filter mounting member 62 in place. The member 62 is made from elastic resin material and is arranged such that when the member 62 is compressed in the directions of the arrows A and B, by applying a firm grip and pressure to the grasping parts $62a_1$ and $62a_2$, the diameter of the annular part 62b will contract and be made smaller. The diameter of the annular part 62b will assume a free dimension when the mounting member 62 is released from compression of the members $62a_1$ and $62a_2$.

When the embodiment of FIG. 11 is utilized, a thin film filter 63 may be cut to a suitable size and placed in position along the optical path defined by the aperture 60d of the filter holding member 60. The cut filter 63 is placed on the optical filter 61 and then the filter mounting member 62 is compressed and brought into locking engagement with the lock parts $60e_1$, $60e_2$, and $60e_3$ of the filter holding member 60. When the members $62a_1$ and $62a_2$ of the filter mounting member 62 are released from compressive force, the member 62 will be locked in place by engagement with the lock parts $60e_1$, $60e_2$, and $60e_3$. Thus, detachment of the filter mounting member 62 and of the thin film filter 63 will be prevented and the filter 63 will be securely held in place interposed between the holding member 60 and the mounting member 62.

When the thin film filter 63 is mounted on the filter device, the filter device may be inserted into an insertion part of a photographic lens 70 in the same manner as has been previously described in connection with the foregoing embodiments. A click ball mechanism 64 for locking the filter device in place is arranged to be actuated by the urging force of a spring (not shown). With the filter device inserted into the insertion part of the lens 70, the click ball mechanism 64 will prevent the filter device from being moved off its inserted position.

It is an advantage of this embodiment of the invention that a thin film filter such as a gelatin filter or a filter made from cellophane, vinyl material, or the like may be utilized in an optical assembly without causing damage to the filter element.

While specific embodiments of the invention have been shown and described in detail to illustrate the application of the inventive principles, it will be understood that the invention may be embodied otherwise without departing from such principles.

What is claimed is:

1. A filter mounting mechanism for use with an optical assembly comprising:
   an accessory holder having a hole formed therethrough, a holding part which carries a filter and a grip part which is arranged to enable attachment and detachment of said filter mounting mechanism to and from a filter mounting part of said optical assembly; and
   filter locking means for locking said filter to said holding part, said filter locking means having a lock member inserted into said hole formed through said accessory holder, and spring means for urging said lock member, one end of said lock member projecting to the exterior of said accessory holder, whereby said projecting portion of said lock member is pushed against the urging force of said spring means when said accessory holder is mounted on said optical assembly and said filter is held on said holding part of the accessory holder.

2. A filter device having an optical axis comprising:
   an accessory holder arranged to be attachable to and detachable from optical apparatus, said accessory holder having a hole formed therethrough and a mounting part adapted to permit a filter to be attached thereto and detached therefrom;
   filter locking means having first and second lock members and spring means, said first and second lock members being configured to extend respectively in a direction parallel to said optical axis and in a direction perpendicular to said optical axis and projecting into said hole formed through said accessory holder;
   said first lock member being urged by said spring means to have a part thereof projected from said hole, whereby said second lock member is urged by said first lock member to hold said filter when said accessory holder is mounted on said optical apparatus.

3. A filter device according to claim 2, wherein one of said lock members is made of resin material and said spring means is integrally formed therewith.

* * * * *